Nov. 6, 1934.     L. H. ROVERE ET AL     1,979,284
ELECTRICAL PROTECTIVE SYSTEM
Filed June 1, 1931     2 Sheets-Sheet 1

Inventors
L. H. Rovere
P. H. Estes

By

Eugene C. Brown
Attorney

Patented Nov. 6, 1934

1,979,284

UNITED STATES PATENT OFFICE 1,979,284

ELECTRICAL PROTECTIVE SYSTEM

Lewis H. Rovere, Brooklyn, N. Y., and Phillip H. Estes, Rutherford, N. J., assignors to The Western Union Telegraph Company, New York, N. Y., a corporation of New York Application June 1, 1931, Serial No. 541,509

6 Claims. (Cl. 178—69)

Our invention relates to electrical protective means and particularly to protective means for systems that are subjected to transient disturbances due to their proximity to electrical power transmission lines.

It is well known to those familiar with the art that when the transmission line conductors of a communication system are parallel to an electric power transmission line, potentials are often induced in the transmission line conductors of the communication system. Such potentials are particularly severe during transient disturbances in the power transmission system, necessitating the installation of protective devices in the communication system to protect its sensitive instruments and translating devices from damage.

One object of our invention is to provide a protective means applicable to a communication system to be protected characterized by the ability of the protective means to ground all the lines of the system upon the occurrence of a transient disturbance on any line of the system.

Another object of our invention is to provide an improved protective means applicable to a communication system to be protected, comprising a plurality of relays so interconnected that operation of any relay in response to a surge on one line of the system will effect operation of all the relays to ground all the lines of the system.

In the following description of circuits and arrangements disclosing our invention we shall refer to the accompanying drawings in which:—

Figure 1:
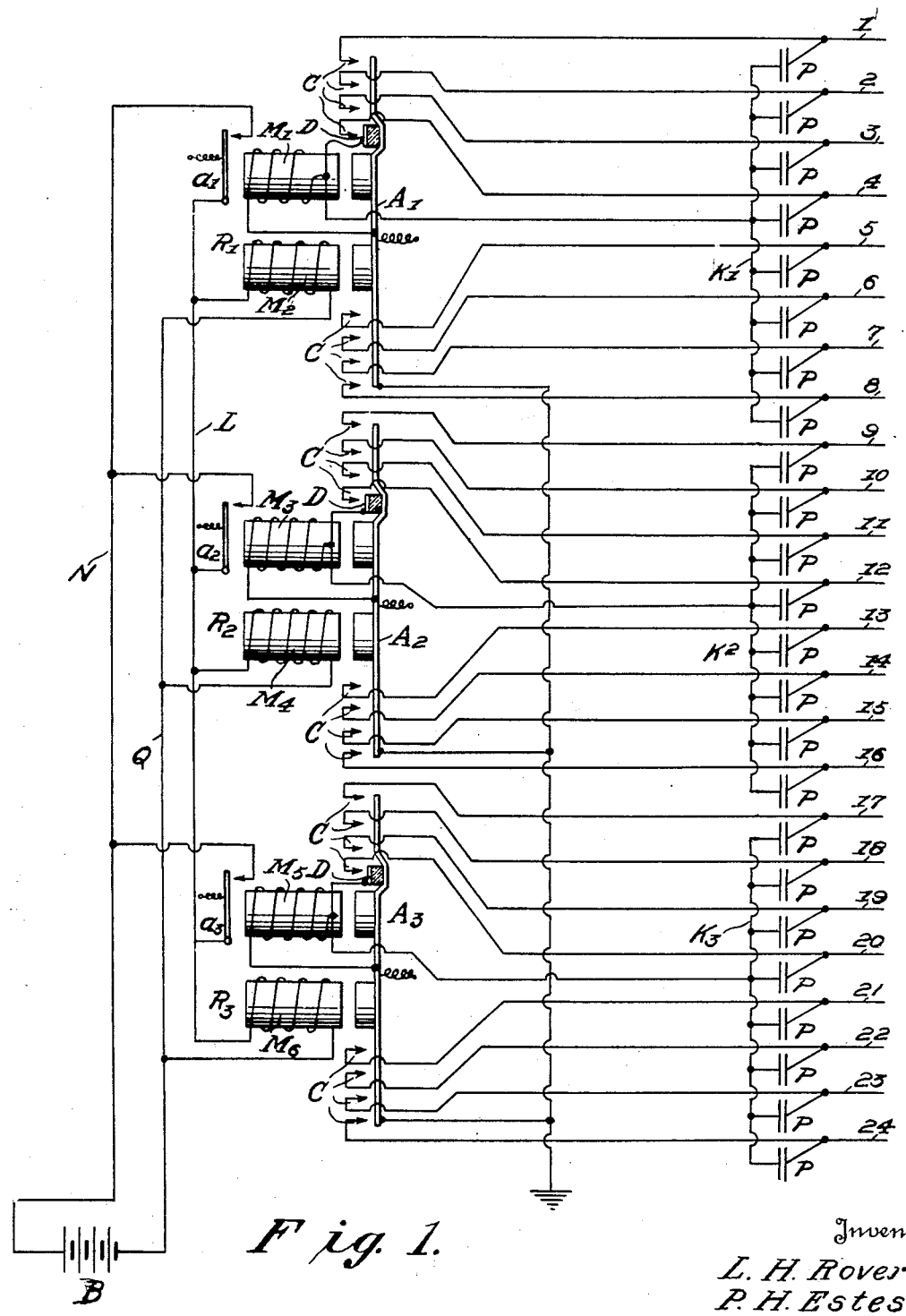
Figure 1 is a diagrammatic view of one embodiment of our invention applied to a communication system comprising a plurality of lines.

In Figure 1 the reference numerals 1 to 24 designate the lines or conductors of a communication system which is to be protected against abnormal voltages set up therein by an extraneous source such as a power line (not shown). Connected with each line of the communication system is a protective device P which may be of any well known type used for the protection of communication circuits. As shown in Figure 1, the lines are arranged in a plurality of groups, each of which is controlled by a group relay, the latter being designated by the reference characters R1, R2 and R3. In each group the lines to be protected are connected to the contacts C of the group relay.

The relays are all alike so that a description of one will suffice for all. Referring to relay R1, it comprises an alternating current magnet M1, a direct current magnet M2 and a main armature A1 common to both magnets, that is, the armature A1 is adapted to be operated by either magnet M1 or magnet M2. The armature A1 carries an insulated contact D adapted to cooperate with one of the contacts C. In addition to the main armature A1 the relay has an auxiliary armature $a1$ arranged to be operated by the alternating current magnet M1.

The auxiliary armatures $a1$, $a2$ and $a3$ are connected to a common conductor L and the front contacts with which these armatures are adapted to cooperate are connected to a common conductor N. Each of the direct current magnets M2, M4 and M6 has one of its terminals connected to the common conductor L and its other terminal connected to a common conductor Q. The conductors N and Q are connected to the battery B. It will be evident from the foregoing description that operation of any one of the auxiliary armatures $a1$, $a2$ or $a3$ will effect the energization of all of the direct current magnets M2, M4 and M6.

The protective devices P in each group are interconnected by a common conductor, the latter being designated by the reference characters K1, K2 and K3. Each of these common conductors is connected to the insulated contact D on the armature of the respective group relay, and also to one terminal of the alternating current winding of the relay. The remaining terminal of the alternating current winding is connected to the main armature of the relay and to ground.

The manner in which the hereinbefore described system operates is as follows: Assume that a transient voltage set up in the communication system causes the breakdown of the protective device P associated with line 1. Current will flow over the common conductor K1 and through the winding of the alternating current magnet M1 of relay R1 and over the main armature A1 of this relay to ground. This will operate armature A1, thereby grounding lines 1 to 8, inclusive. It will be observed that line 4 is connected to ground over the insulated contact D and through the winding of alternating current magnet M1. This provides a holding circuit for the relay R1. Energization of alternating current magnet M1 also operates the auxiliary armature $a1$, thereby establishing an energizing circuit for all the direct current magnets M2, M4 and M6 in parallel. Energization of magnet M2 produces no effect but energization of magnets M4 and M6 operates their respective main armatures A2, A3 thereby connecting lines 9 to 24, inclusive, to ground. A holding circuit is established through the winding of alternating current magnet M3 and a similar circuit is established through the winding of alternating current magnet M5 and these magnets therefore operate their auxiliary armatures a2 and a3, respectively, but without producing any additional effect. When the abnormal condition has passed, the alternating current magnets M1, M3 and M5 release their respective auxiliary armatures thereby deenergizing the direct current magnets M2, M4 and M6 and restoring all the lines to their original condition. The normal current in the lines will not operate the magnets.

Although in Figure 1 we have shown eight lines in each group it is to be understood of course that any desired number of lines may be included in a group.

Figure 2:
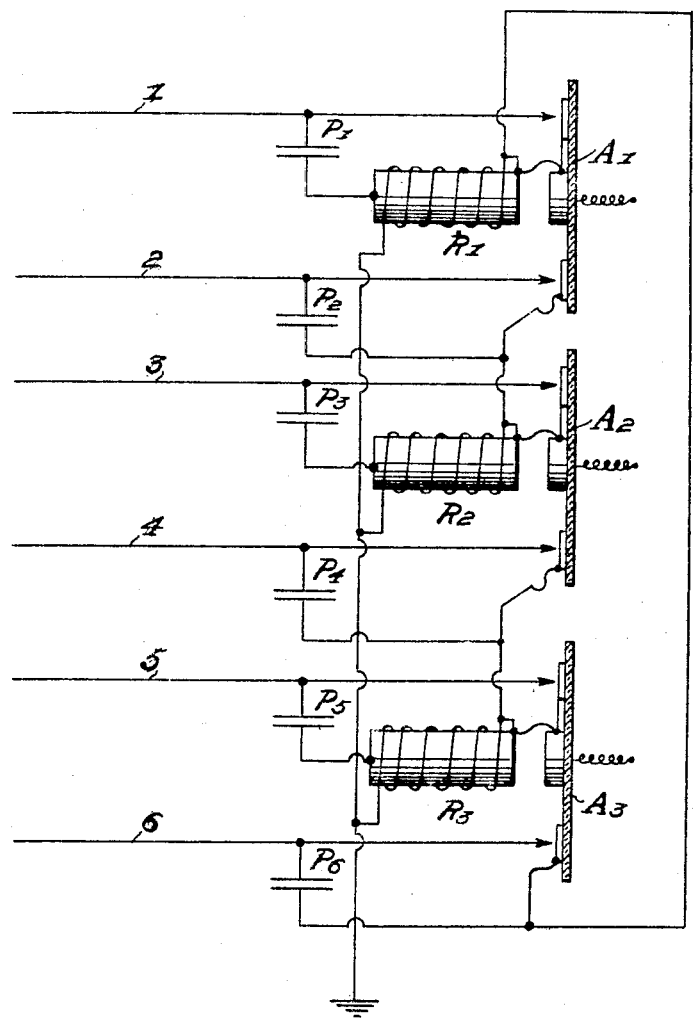
Figure 2 is a diagrammatic view showing a modified embodiment of our invention applied to a communication system.

In the embodiment of our invention illustrated in Figure 2 each relay is provided with two contacts and is therefore adapted to control two lines. One terminal of relay R1 is connected to armature A3 of relay R3 and to protective devices P1 and P6. One terminal of relay R2 is connected to armature A1 of relay R1 and to protective devices P2 and P3. One terminal of relay R3 is connected to armature A2 of relay R2 and to protective devices P4 and P5. The remaining terminals of the relays R1, R2 and R3 are connected to ground.

In operation, let it be assumed that upon the occurrence of an abnormal voltage the protective device of line 3 breaks down. This will cause a flow of current through the winding of relay R2 to ground. Relay R2 will operate, thereby grounding line 3 through its own winding thus establishing a holding circuit for itself. Operation of relay R2 also grounds line 4 through the winding of the relay R3. Relay R3 operates and grounds line 5 through its own winding thus establishing a holding circuit for itself. Operation of relay R3 also grounds line 6 through the winding of relay R1. Relay R1 operates and grounds line 1 through its own winding thereby establishing a holding circuit for itself. Operation of relay R1 also grounds line 2 through the winding of relay R2. When the abnormal condition ceases, the relays become deenergized and release their armatures, thereby breaking the connections to ground and restoring the system to its original condition.

While this invention has been disclosed as embodied in particular forms, it will be evident to engineers that various changes and modifications can be made within the scope of the appended claims.

What we claim as new and desire to secure by Letters Patent of the United States, is:—

1. In an electrical protective system the combination with a plurality of groups of lines to be protected from voltages set up by an extraneous source, of a protective device connected with each line and means individual to each group responsive to operation of any one of said protective devices for connecting all of said lines to ground, each of said means comprising a relay operating to ground the lines of its group and to cause the operation of the relays of the other groups.

2. In an electrical protective system, the combination with a plurality of lines to be protected from voltages set up by an extraneous source, of a protective device individual to each line, a plurality of relays each responsive to the operation of any protective device of a certain group of lines, and inter-connections whereby each relay when actuated operates to cause the operation of the relays associated with all of the other groups of lines.

3. In an electrical protective system the combination with a plurality of groups of lines to be protected from voltages set up by an extraneous source, of a protective device connected with each line and means individual to each group responsive to operation of any one of said protective devices for connecting all of said lines to ground, each of said means comprising a relay operating to ground the lines of its group and electrical interlocking connections between said relays whereby operation of any relay effects operation of the other relays.

4. In an electrical protective system the combination with a plurality of lines to be protected from voltages set up by an extraneous source, of a protective device connected with each line and means responsive to operation of any one of said protective devices for connecting all of said lines to ground, said means comprising a plurality of relays each of which controls a group of said lines and an electrical interlock between said relays whereby operation of any relay effects operation of the other relays, said interlock comprising auxiliary windings for each relay and auxiliary armatures for controlling said auxiliary windings.

5. In an electrical protective system the combination with a plurality of lines to be protected from voltages set up by an extraneous source, of a protective device connected with each line and means responsive to operation of any one of said protective devices for connecting all of said lines to ground, said means comprising a plurality of relays each of which controls a group of said lines and an electrical interlock between said relays whereby operation of any relay effects operation of the other relays, said interlock comprising an auxiliary winding and an auxiliary armature for each relay and an auxiliary circuit interconnecting said auxiliary armatures and auxiliary windings.

6. In an electrical protective system the combination with a plurality of groups of lines to be protected from voltages set up by an extraneous source, of a protective device connected with each line and means individual to each group responsive to operation of any one of said protective devices for connecting all of each of said lines to ground, said means comprising a relay operating to ground the lines of its group through its winding for the discharge of voltage induced by said extraneous source thereby maintaining the relay in operation only during the abnormal condition so that the system is automatically restored to normal condition upon the cessation of said condition, and electrical interlocking connections between said relays whereby operation of any relay effects operation of the other relays.

LEWIS H. ROVERE.
PHILLIP H. ESTES.